(12) United States Patent
Yang

(10) Patent No.: US 8,439,783 B2
(45) Date of Patent: *May 14, 2013

(54) PENETRATING SHAFT TYPE PLANETARY GEAR TRAIN WITH BIDIRECTIONAL INPUT AND ONE-WAY OUTPUT

(76) Inventor: Tai-Her Yang, Dzan-Hwa (TW)

(*) Notice: Subject to any disclaimer, the term of this patent is extended or adjusted under 35 U.S.C. 154(b) by 35 days.

This patent is subject to a terminal disclaimer.

(21) Appl. No.: 12/699,154

(22) Filed: Feb. 3, 2010

(65) Prior Publication Data

US 2011/0190089 A1  Aug. 4, 2011

(51) Int. Cl.
*F16H 3/72* (2006.01)
*F16H 37/06* (2006.01)

(52) U.S. Cl.
USPC .............................................. 475/8; 475/207

(58) Field of Classification Search .................. 475/4, 5, 475/8, 149, 207
See application file for complete search history.

(56) References Cited

U.S. PATENT DOCUMENTS

| | | | | |
|---|---|---|---|---|
| 5,531,651 A * | 7/1996 | Yang | | 475/12 |
| 5,607,369 A * | 3/1997 | Yang | | 475/12 |
| 8,201,839 B2 * | 6/2012 | Yang | | 280/238 |

* cited by examiner

*Primary Examiner* — Justin Holmes
(74) *Attorney, Agent, or Firm* — Bacon & Thomas, PLLC

(57) ABSTRACT

For the penetrating shaft type planetary gear train with bidirectional input and one-way output, the planetary gear train and one-way transmission integrate to constitute the planetary gear train, in which the driven rotary direction of the input shaft of the gear train with bidirectional input and one-way output is changed, and the output rotary direction of the output shaft is constant.

12 Claims, 4 Drawing Sheets

PENETRATING SHAFT TYPE PLANETARY GEAR TRAIN WITH BIDIRECTIONAL INPUT AND ONE-WAY OUTPUT

BACKGROUND OF THE INVENTION (a) Field of the Invention

For the penetrating shaft type planetary gear train with bidirectional input and one-way output, the planetary gear train and one-way transmission integrate to implement transmission operation with bidirectional input and one-way output for the planetary gear train, in which one or two ends of the input shaft of the penetrating shaft type planetary gear train with bidirectional input and one-way output may be driven at the first rotary direction and the second rotary direction, respectively, and there are different speed ratios occurring at the one-way output shaft, so as to resolve the limitation of the coaxial gear train with bidirectional input and one-way output constituted by the tandem planetary transmission gear train in prior art, which cannot be input through two ends of the input shaft.

(b) Description of the Prior Art

Conventionally, the gear train with bidirectional input and constant rotary direction output with application restriction, which is constituted by the tandem planetary gear train, cannot be input through two ends of the input shaft.

SUMMARY OF THE INVENTION

For the penetrating shaft type planetary gear train with bidirectional input and one-way output, the planetary gear train and one-way transmission integrate to constitute the planetary gear train, in which the driven rotary direction of the input shaft of the gear train with bidirectional input and one-way output is changed, and the output rotary direction of the output shaft is constant, it is characterized by the planetary gear train integrating with the one-way transmission to implement transmission operation with bidirectional input and one-way output for the planetary gear train, in which one and/or two ends of the input shaft of the penetrating shaft type planetary gear train with bidirectional input and one-way output may be driven at the first rotary direction and the second rotary direction, respectively, and there are different speed ratios occurring at the one-way output shaft, so as to resolve the limitation of the coaxial gear train with bidirectional input and one-way output constituted by the tandem planetary transmission gear train, which cannot be input through two ends of the input shaft.

Figure 1:
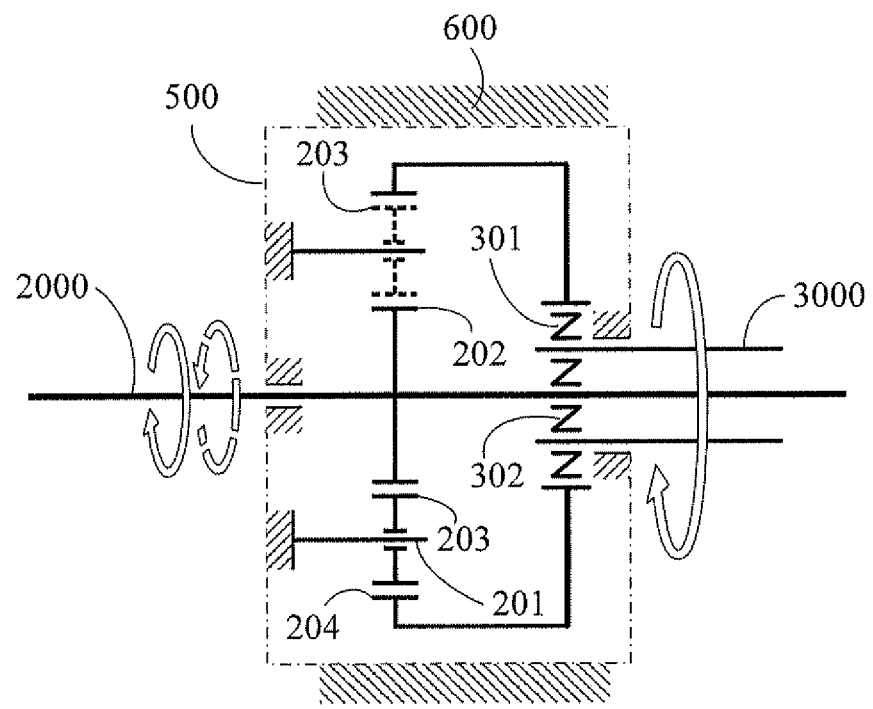
FIG. 1 is a structural schematic view showing the 1st embodiment of the penetrating shaft type planetary gear train with bidirectional input and one-way output constituted by the planetary gear train, according to the present invention.

DESCRIPTION OF MAIN COMPONENT SYMBOLS (301), (302), (303), (305): One-way transmission
(200): Planetary wheel support arm annular shelf
(201): Planetary wheel shaft
(202): Sun wheel
(203): Planetary wheel
(204): Outer wheel
(500): Shell of the transmission gear train
(600): Machine body
(2000): Input shaft
(3000): Output shaft

DETAILED DESCRIPTION OF THE PREFERRED EMBODIMENTS

The structural pattern of the penetrating shaft type planetary gear train with bidirectional input and one-way output includes the input shaft and the output shaft coaxially fitting;

the main features are as following:
transmission component: related to the planetary wheel constituted by gears and/or friction wheels;
the forward and reverse rotary power source deriving from one or more of the following power source, including human power, machine power, electric motors, hydraulic motors or pneumatic motors; including:
(1) the forward and reversely driven by human power; or
(2) the forward and reversely driven by machine power; or
(3) the forward and reversely driven by hydraulic or pneumatic motors; or
(4) the forward and reversely driven by electric motors; or
(5) driven at different directions by the rotary power sources from (1)~(4).

The operational features of the penetrating shaft type planetary gear train with bidirectional input and one-way output are as following:
the first rotary direction and the second rotary direction are reverse;
if the input terminal is driven by the first rotary direction, the first rotary direction output is produced through the first driving gear train driving the output terminal;
if the input terminal is driven by the second rotary direction, the first rotary direction output is produced through the second driving gear train driving the output terminal;
an one-way transmission is installed between the first driving gear train and the second driving gear train to avoid the interference from the second driving gear train when the first driving gear train is used to be the first rotary direction input and produces the first rotary direction output; and
an one-way transmission is installed between the second driving gear train and the first driving gear train to avoid the interference from the first driving gear train when the second driving gear train is used to be the second rotary direction input and produces the first rotary direction output.

Some embodiments are provided as following to describe the enforceability of the penetrating shaft type planetary gear train with bidirectional input and one-way output, and the other embodiments with same functions are omitted.

The following are a variety of structural types of the penetrating shaft type planetary gear train with bidirectional input and one-way output, the structural descriptions are as following:

As shown in FIGS. 1 to 7, the penetrating shaft type planetary gear train with bidirectional input and one-way output is constituted by the planetary gear train, including:

FIG. 1 is a structural schematic view showing the 1st embodiment of the penetrating shaft type planetary gear train with bidirectional input and one-way output constituted by the planetary gear train, according to the present invention.

As shown in FIG. 1, the penetrating shaft type planetary gear train with bidirectional input and one-way output is constituted by the planetary gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the penetrating shaft type planetary gear train with bidirectional input and one-way output;

machine body (600): relatively static organization structure;

the input shaft (2000) integrated with the sun wheel (202);

the planetary wheel (203) installed between the outer wheel (204) and the sun wheel (202); the center of the planetary wheel (203) rotating at the planetary wheel shaft (201), one end of the planetary wheel shaft (201) integrated with the planetary wheel support arm annular shelf (200), and the planetary wheel support arm annular shelf (200) fixed at the shell of the transmission gear train (500);

the shell of the transmission gear train (500) fixed at the machine body (600);

an one-way transmission (301) installed between the outer wheel (204) and the output shaft (3000);

the sun wheel (202), the planetary wheel (203), and the outer wheel (204) constituted by gears or friction wheels;

the planetary wheel (203) driven by the sun wheel (202), in which the status of the transmission ratio is for acceleration, deceleration, or constant velocity;

the outer wheel (204) driven by the planetary wheel (203), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the sun wheel (202) for further driving the planetary wheel (203) and the outer wheel (204), and through the outer wheel (204) and the one-way transmission (301), for driving the output shaft (3000) to produce the first rotary direction output to constitute the second driving gear train.

Figure 2:
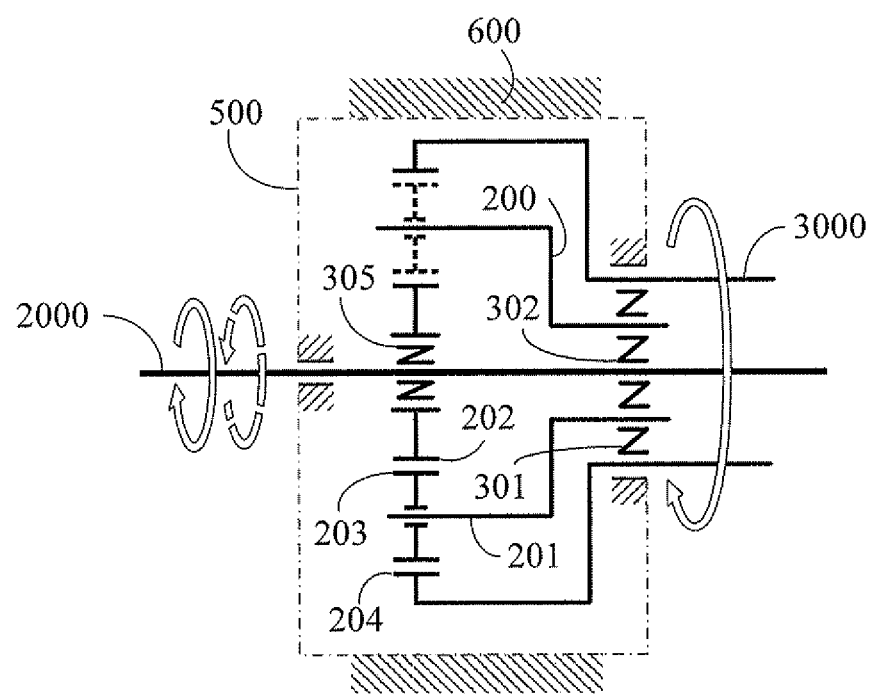
FIG. 2 is a structural schematic view showing the 2nd embodiment of the penetrating shaft type planetary gear train with bidirectional input and one-way output constituted by the planetary gear train, according to the present invention.

FIG. 2 is a structural schematic view showing the 2nd embodiment of the penetrating shaft type planetary gear train with bidirectional input and one-way output constituted by the planetary gear train, according to the present invention.

As shown in FIG. 2, the penetrating shaft type planetary gear train with bidirectional input and one-way output is constituted by the planetary gear train with the input shaft and the output shaft coaxial fitting, the main components including:

one end of the input shaft (2000) through installed at one side of the shell of the transmission gear train (500) via bearing structure, another end of the input shaft (2000) through the one-way transmission (302) and the planetary wheel support arm annular shelf (200), the one-way transmission (301) through the output shaft (3000), and a bearing installed between the output shaft (3000) and the shell of the transmission gear train (500);

shell of the transmission gear train (500): machine parts installed for constituting the penetrating shaft type planetary gear train with bidirectional input and one-way output;

machine body (600): relatively static organization structure;

the one-way transmission (305) installed between the input shaft (2000) and the sun wheel (202);

the planetary wheel (203) installed between the outer wheel (204) and the sun wheel (202); the planetary wheel (203) circumgyrating at the planetary wheel shaft (201), the planetary wheel shaft (201) installed at the planetary wheel support arm annular shelf (200), and the planetary wheel support arm annular shelf (200) coaxially installed between the one-way transmission (301) and the one-way transmission (302);

the shell of the transmission gear train (500) fixed at the machine body (600);

the one-way transmission (301) installed between the outer bevel wheel (204) and the planetary wheel support arm annular shelf (200);

the sun wheel (202), the planetary wheel (203), and the outer wheel (204) constituted by gears or friction wheels;

the planetary wheel (203) driven by the sun wheel (202), in which the status of the transmission ratio is for acceleration, deceleration, or constant velocity;

the outer wheel (204) driven by the planetary wheel (203), in which the status of the transmission ratio is for acceleration, deceleration, or constant velocity;

by way of the above structure, the input shaft (2000) driven at the first rotary direction, through the one-way transmission (302) and the one-way transmission (301) for driving the output shaft (3000) to produce the first rotary direction output to constitute the first driving gear train;

by way of the above structure, the input shaft (2000) is driven at the second rotary direction, through the one-way transmission (305) for driving the planetary wheel (203) and the outer wheel (204), for driving the output shaft (3000) to produce the first rotary direction output to constitute the second driving gear train.

Figure 3:
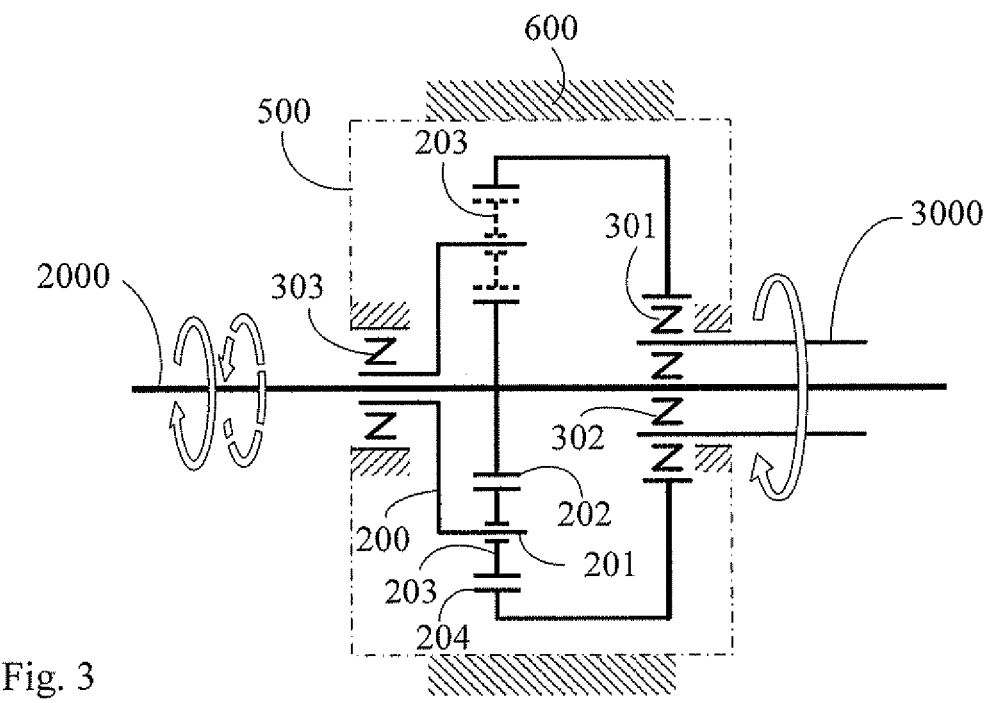
FIG. 3 is a structural schematic view showing the 3rd embodiment of the penetrating shaft type planetary gear train with bidirectional input and one-way output constituted by the planetary gear train, according to the present invention.

FIG. 3 is a structural schematic view showing the 3rd embodiment of the penetrating shaft type planetary gear train with bidirectional input and one-way output constituted by the planetary gear train, according to the present invention.

As shown in FIG. 3, the penetrating shaft type planetary gear train with bidirectional input and one-way output is constituted by the planetary gear train with the input shaft and the output shaft coaxial fitting, the main components including:

one end of the input shaft (2000) through installed at the planetary wheel support arm annular shelf (200) via bearing structure, the planetary wheel support arm annular shelf (200) integrated at one side of the shell of the transmission gear train (500) via the one-way transmission (303), another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the penetrating shaft type planetary gear train with bidirectional input and one-way output;

machine body (600): relatively static organization structure;

the input shaft (2000) integrated with the sun wheel (202);

the planetary wheel (203) installed between the outer wheel (204) and the sun wheel (202); the center of the planetary wheel (203) circumgyrating at the planetary wheel shaft (201), the planetary wheel shaft (201) integrated with the planetary wheel support arm annular shelf (200), and the planetary wheel support arm annular shelf (200) circumgyrating between the input shaft (2000) and the one-way transmission (303);

the shell of the transmission gear train (500) fixed at the machine body (600);

the outer wheel (204) surrounding the output shaft (3000) via the one-way transmission (301);

the sun wheel (202), the planetary wheel (203), and the outer wheel (204) constituted by gears or friction wheels;

the planetary wheel (203) driven by the sun wheel (202), in which the status of the transmission ratio is for acceleration, deceleration, or constant velocity;

the outer wheel (204) driven by the planetary wheel (203), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the sun wheel (202), the planetary wheel (203) and the outer wheel (204), and further through the one-way transmission (301) for driving the output shaft (3000) to produce the first rotary direction output to constitute the second driving gear train.

Figure 4:
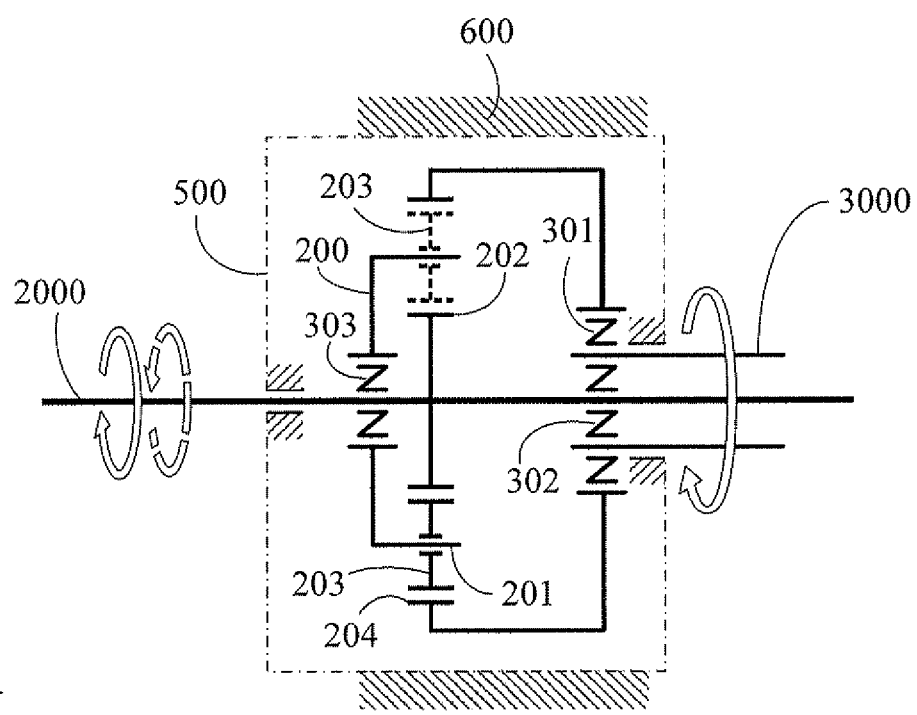
FIG. 4 is a structural schematic view showing the 4th embodiment of the penetrating shaft type planetary gear train with bidirectional input and one-way output constituted by the planetary gear train, according to the present invention.

FIG. 4 is a structural schematic view showing the 4th embodiment of the penetrating shaft type planetary gear train with bidirectional input and one-way output constituted by the planetary gear train, according to the present invention.

As shown in FIG. 4, the penetrating shaft type planetary gear train with bidirectional input and one-way output is constituted by the planetary gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the penetrating shaft type planetary gear train with bidirectional input and one-way output;

machine body (600): relatively static organization structure;

input shaft (2000) integrated with sun wheel (202);

the planetary wheel (203) installed between the outer wheel (204) and the sun wheel (202); the center of the planetary wheel (203) circumgyrating at the planetary wheel shaft (201), the planetary wheel shaft (201) integrated with the planetary wheel support arm annular shelf (200) of the shell (500) near the transmission gear train, and the one-way transmission (303) installed between the planetary wheel support arm annular shelf (200) and the input shaft (2000);

the shell of the transmission gear train (500) fixed at the machine body (600);

the outer wheel (204) surrounding the output shaft (3000) via the one-way transmission (301);

the sun wheel (202), the planetary wheel (203), and the outer wheel (204) constituted by gears or friction wheels;

the planetary wheel (203) driven by the sun wheel (202), in which the status of the transmission ratio is for acceleration, deceleration, or constant velocity;

the outer wheel (204) driven by the planetary wheel (203), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the sun wheel (202), the planetary wheel (203) and the outer wheel (204), and further through the one-way transmission (301) for driving the output shaft (3000) to produce the first rotary direction output to constitute the second driving gear train.

Figure 5:
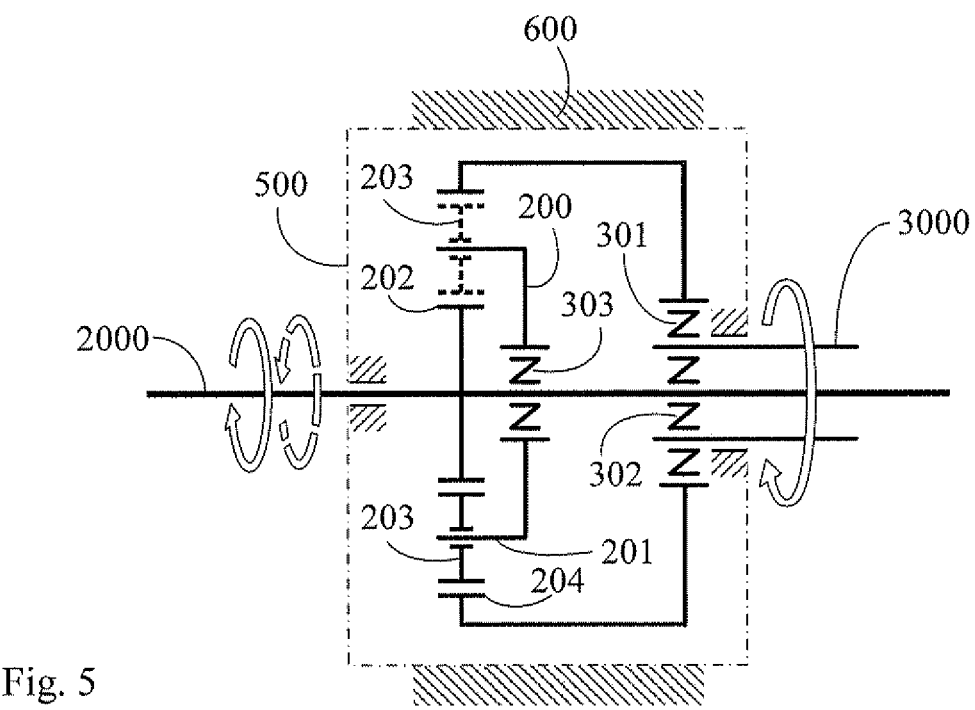
FIG. 5 is a structural schematic view showing the 5th embodiment of the penetrating shaft type planetary gear train with bidirectional input and one-way output constituted by the planetary gear train, according to the present invention.

FIG. 5 is a structural schematic view showing the 5th embodiment of the penetrating shaft type planetary gear train with bidirectional input and one-way output constituted by the planetary gear train, according to the present invention.

As shown in FIG. 5, the penetrating shaft type planetary gear train with bidirectional input and one-way output is constituted by the planetary gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the penetrating shaft type planetary gear train with bidirectional input and one-way output;

machine body (600): relatively static organization structure;

input shaft (2000) integrated with sun wheel (202);

the planetary wheel (203) installed between the outer wheel (204) and the sun wheel (202); the center of the planetary wheel (203) circumgyrating at the planetary wheel shaft (201), the planetary wheel shaft (201) integrated with the planetary wheel support arm annular shelf (200) installed between the sun wheel (202) and the one-way transmission (302), and the one-way transmission (303) installed between the planetary wheel support arm annular shelf (200) and the input shaft (2000);

the shell of the transmission gear train (500) fixed at the machine body (600);

the outer wheel (204) surrounding the output shaft (3000) via the one-way transmission (301);

the sun wheel (202), the planetary wheel (203), and the outer wheel (204) constituted by gears or friction wheels;

the planetary wheel (203) driven by the sun wheel (202), in which the status of the transmission ratio is for acceleration, deceleration, or constant velocity;

the outer wheel (204) driven by the planetary wheel (203), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the sun wheel (202), the planetary wheel (203) and the outer wheel (204), and further through the one-way transmission (301) for driving the output shaft (3000) to produce the first rotary direction output to constitute the second driving gear train.

Figure 6:
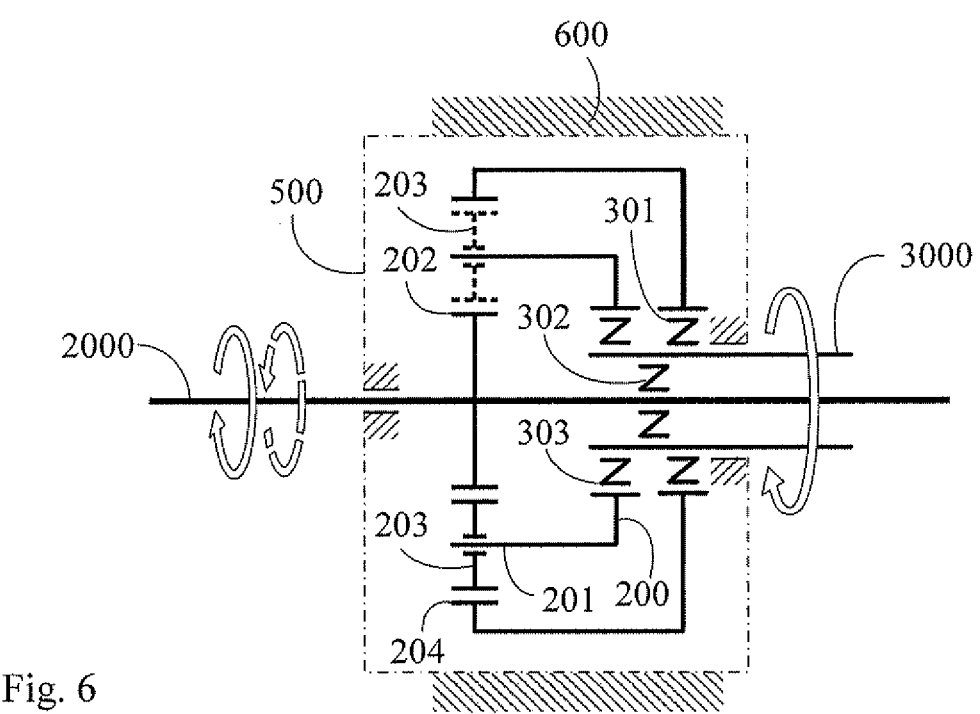
FIG. 6 is a structural schematic view showing the 6th embodiment of the penetrating shaft type planetary gear train with bidirectional input and one-way output constituted by the planetary gear train, according to the present invention.

FIG. 6 is a structural schematic view showing the 6th embodiment of the penetrating shaft type planetary gear train with bidirectional input and one-way output constituted by the planetary gear train, according to the present invention.

As shown in FIG. 6, the penetrating shaft type planetary gear train with bidirectional input and one-way output is constituted by the planetary gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the penetrating shaft type planetary gear train with bidirectional input and one-way output;

machine body (600): relatively static organization structure;

input shaft (2000) integrated with sun wheel (202);

the planetary wheel (203) installed between the outer wheel (204) and the sun wheel (202); the center of the planetary wheel (203) circumgyrating at the planetary wheel shaft (201), the planetary wheel shaft (201) integrated with the planetary wheel support arm annular shelf (200) installed at the output shaft (3000), and the one-way transmission (303) installed between the planetary wheel support arm annular shelf (200) and the output shaft (3000);

the shell of the transmission gear train (500) fixed at the machine body (600);

the outer wheel (204) surrounding the output shaft (3000) via the one-way transmission (301);

the sun wheel (202), the planetary wheel (203), and the outer wheel (204) constituted by gears or friction wheels;

the planetary wheel (203) driven by the sun wheel (202), in which the status of the transmission ratio is for acceleration, deceleration, or constant velocity;

the outer wheel (204) driven by the planetary wheel (203), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the sun wheel (202), the planetary wheel (203) and the outer wheel (204), and further through the one-way transmission (301) for driving the output shaft (3000) to produce the first rotary direction output to constitute the second driving gear train.

Figure 7:
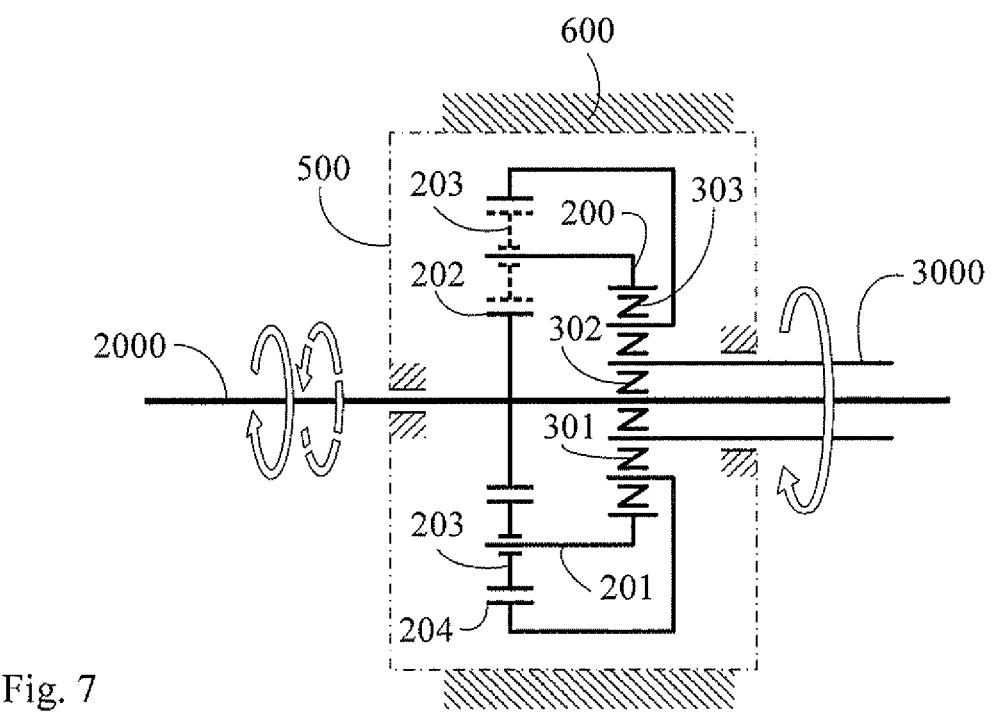
FIG. 7 is a structural schematic view showing the 7th embodiment of the penetrating shaft type planetary gear train with bidirectional input and one-way output constituted by the planetary gear train, according to the present invention.

FIG. 7 is a structural schematic view showing the 7th embodiment of the penetrating shaft type planetary gear train with bidirectional input and one-way output constituted by the planetary gear train, according to the present invention.

As shown in FIG. 7, the penetrating shaft type planetary gear train with bidirectional input and one-way output is constituted by the planetary gear train with the input shaft and the output shaft coaxial fitting, the main components including:

one end of the input shaft (2000) through installed at one side of the shell of the transmission gear train (500) via bearing structure, another end of the input shaft (2000) through the output shaft (3000) via the one-way transmission (302), and a bearing installed between the output shaft (3000) and the shell of the transmission gear train (500);

shell of the transmission gear train (500): machine parts installed for constituting the penetrating shaft type planetary gear train with bidirectional input and one-way output;

machine body (600): relatively static organization structure;

input shaft (2000) integrated with sun wheel (202);

the planetary wheel (203) installed between the outer wheel (204) and the sun wheel (202); the center of the planetary wheel (203) circumgyrating at the planetary wheel shaft (201), the planetary wheel shaft (201) integrated with the planetary wheel support arm annular shelf (200), and the one-way transmission (303) installed between the planetary wheel support arm annular shelf (200) and the outer wheel (204);

the shell of the transmission gear train (500) fixed at the machine body (600);

the outer wheel (204) surrounding the output shaft (3000) via the one-way transmission (301);

the sun wheel (202), the planetary wheel (203), and the outer wheel (204) constituted by gears or friction wheels;

the planetary wheel (203) driven by the sun wheel (202), in which the status of the transmission ratio is for acceleration, deceleration, or constant velocity;

the outer wheel (204) driven by the planetary wheel (203), in which the status of the transmission ratio is for acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, the input shaft (2000) is driven at the second rotary direction, through the sun wheel (202), the planetary wheel (203) and the outer wheel (204), and further through the one-way transmission (301) for driving the output shaft (3000) to produce the first rotary direction output to constitute the second driving gear train.

The invention claimed is:

1. A penetrating shaft type planetary gear train apparatus with a bidirectional input and a one-way output, comprising:
   an input shaft (2000) connected to a bidirectional power source having a first rotary direction and a second rotary direction opposite the first rotary direction;
   an output shaft (3000) that is coaxial with and surrounds a portion of the input shaft (2000), said output shaft (3000) having a single rotary output direction;
   a transmission component including a planetary gear train for transmitting power between the input shaft (2000) and the output shaft (3000), said transmission including:
      a first drive train for driving said output shaft (3000) in said single output direction when said input shaft (2000) is driven in said first rotary direction;
      a second drive train for driving said output shaft (3000) in said single output direction when said input shaft (2000) is driven in said second rotary direction;
      at least two one-way transmissions (301,302,303,305) respectively installed in said first and second drive trains for preventing interference between said first and second drive trains when said input shaft (2000) is driven in said first and second rotary directions, at least one of said one-way transmissions being positioned between said input shaft (2000) and said output shaft (3000), and at the same time at least one other of the one-way transmissions being positioned between said output shaft (3000) and at least one of a planetary wheel support arm annular shelf (200) and a ring wheel (204) of said planetary gear train.

2. A penetrating shaft type planetary gear train apparatus with a bidirectional input and a one-way output as claimed in claim 1, wherein said planetary gear train includes:
   a shell (500) having opposite sides at which the input shaft (2000) and output shaft (3000) are respectively rotatably mounted;
   a sun wheel (202) integrated with the input shaft (2000);
   said ring wheel (204);
   at least one planetary gear (203) rotatably mounted on a shaft extending from said shell (500) and rotatably engaged with said sun wheel (202) and said ring wheel (204) to form said planetary gear train;
   a first said one-way transmission coupled between said ring wheel (204) and said output shaft (3000) for transmitting power between said planetary gear train and said output shaft (3000) when said input shaft (2000) is rotated in said first rotary direction; and
   a second said one-way transmission (302) coupled between said input shaft (2000) and said output shaft (3000) for transmitting power directly between said input shaft (2000) and said output shaft (3000) when said input shaft (2000) is rotated in said second direction.

3. A penetrating shaft type planetary gear train apparatus with a bidirectional input and a one-way output as claimed in claim 1, wherein said planetary gear train includes:
   a shell (500) having opposite sides at which the input shaft (2000) and output shaft (3000) are respectively rotatably mounted;
   a sun wheel (202);
   said ring wheel (204) having an extension that forms said output shaft (3000);
   at least one planetary wheel (203) installed on said planetary wheel support arm annular shelf (200), said support arm annular shelf (200) extending coaxially between said input shaft (2000) and said output shaft (3000) and rotatably engaged with said sun wheel (202) and said ring wheel (204) to form said planetary gear train;
   a first said one-way transmission coupled between said support arm annular shelf (200) and said output shaft (3000);
   a second one-way transmission (302) coupled between said input shaft (2000) and said support arm annular shelf (200); and
   a third one-way transmission (305) coupled between said input shaft (2000) and said sun wheel (202),
   wherein when said input shaft (2000) is driven in the first rotary direction, said input shaft drives said output shaft (3000) through the second one-way transmission (302) and the first one-way transmission (301), and when said input shaft (2000) is driven in the second rotary direction, said input shaft (2000) drives said output shaft (3000) through said third one-way transmission (305) and said planetary gear train.

4. A penetrating shaft type planetary gear train apparatus with a bidirectional input and a one-way output as claimed in claim 1, wherein said planetary gear train includes:
   a shell (500) having opposite sides at which the input shaft (2000) and output shaft (3000) are respectively rotatably mounted;
   a sun wheel (202) integrated with said input shaft (2000);
   said ring wheel (204);
   at least one planetary wheel (203) installed on said planetary wheel support arm annular shelf (200), said support arm annular shelf (200) including a sleeve extending coaxially between said input shaft (2000) and said shell (500) and being rotatable relative to said input shaft (2000), and said at least one planetary wheel (203) being rotatably engaged with said sun wheel (202) and said ring wheel (204) to form said planetary gear train;
   a first one-way transmission (301) coupled between the ring wheel (204) and the output shaft (3000);
   a second said one-way transmission (302) coupled between said input shaft (2000) and said output shaft (3000); and
   a third one-way transmission (303) coupled between the support arm annular shelf (200) and the shell (500),
   wherein when said input shaft (2000) is driven in the first rotary direction, said third one-way transmission (303) prevents said support arm annular shelf (200) from rotating and said input shaft (2000) drives said output shaft (3000) through said planetary gear train and said first one-way transmission (301) and when said input shaft (2000) is driven in the second rotary direction, said input shaft (2000) drives said output shaft (3000) through said second one-way transmission (302).

5. A penetrating shaft type planetary gear train apparatus with a bidirectional input and a one-way output as claimed in claim 1, wherein said planetary gear train includes:
- a shell (500) having opposite sides at which the input shaft (2000) and output shaft (3000) are respectively rotatably mounted;
- a sun wheel (202) integrated with said input shaft (2000); said ring wheel (204);
- at least one planetary wheel (203) installed on said planetary wheel support arm annular shelf (200) and rotatably engaged with said sun wheel (202) and said ring wheel (204) to form said planetary gear train;
- a first one-way transmission (301) coupled between the ring wheel (204) and the output shaft (3000);
- a second said one-way transmission (302) coupled between said input shaft (2000) and said output shaft (3000); and
- a third one-way transmission (303) coupled between the first input shaft (2000) and the support arm annular shelf (200),
- wherein when said input shaft (2000) is driven in the first rotary direction, said third one-way transmission (303) prevents said support arm annular shelf (200) from rotating and said input shaft (2000) drives said output shaft (3000) through said planetary gear train and said first one-way transmission (301) and when said input shaft (2000) is driven in the second rotary direction, said input shaft (2000) drives said output shaft (3000) through said second one-way transmission (302).

6. A penetrating shaft type planetary gear train apparatus with a bidirectional input and a one-way output as claimed in claim 5, wherein said third one-way transmission (303) is position on one of an input side and an output side of said sun wheel (202).

7. A penetrating shaft type planetary gear train apparatus with a bidirectional input and a one-way output as claimed in claim 1, wherein said planetary gear train includes:
- a shell (500) having opposite sides at which the input shaft (2000) and output shaft (3000) are respectively rotatably mounted;
- a sun wheel (202) integrated with said input shaft (2000); said ring wheel (204);
- at least one planetary wheel (203) installed on said planetary wheel support arm annular shelf (200) and rotatably engaged with said sun wheel (202) and said ring wheel (204) to form said planetary gear train;
- a first one-way transmission (301) coupled between the ring wheel (204) and the output shaft (3000);
- a second said one-way transmission (302) coupled between said input shaft (2000) and said output shaft (3000); and
- a third one-way transmission (303) coupled between the support arm annular shelf (200) and the output shaft (3000),
- wherein when said input shaft (2000) is driven in the first rotary direction, said third one-way transmission (303) prevents said support arm annular shelf (200) from rotating and said input shaft (2000) drives said output shaft (3000) through said planetary gear train and said first one-way transmission (301) and when said input shaft (2000) is driven in the second rotary direction, said input shaft (2000) drives said output shaft (3000) through said second one-way transmission (302).

8. A penetrating shaft type planetary gear train apparatus with a bidirectional input and a one-way output as claimed in claim 1, wherein said planetary gear train includes:
- a shell (500) having opposite sides at which the input shaft (2000) and output shaft (3000) are respectively rotatably mounted;
- a sun wheel (202) integrated with said input shaft (2000); said ring wheel (204);
- at least one planetary wheel (203) installed on said planetary wheel support arm annular shelf (200) and rotatably engaged with said sun wheel (202) and said ring wheel (204) to form said planetary gear train;
- a first one-way transmission (301) coupled between the ring wheel (204) and the output shaft (3000);
- a second said one-way transmission (302) coupled between said input shaft (2000) and said output shaft (3000); and
- a third one-way transmission (303) coupled between the support arm annular shelf (200) and the ring wheel (204),
- wherein when said input shaft (2000) is driven in the first rotary direction, said third one-way transmission (303) prevents said support arm annular shelf (200) from rotating and said input shaft (2000) drives said output shaft (3000) through said planetary gear train and said first one-way transmission (301) and when said input shaft (2000) is driven in the second rotary direction, said input shaft (2000) drives said output shaft (3000) through said second one-way transmission (302).

9. A penetrating shaft type planetary gear train apparatus with a bidirectional input and a one-way output as claimed in claim 1, wherein said sun wheel (202), at least one planetary wheel (203), and ring wheel (204) are gears or friction wheels.

10. A penetrating shaft type planetary gear train apparatus with a bidirectional input and a one-way output as claimed in claim 1, wherein said bidirectional power source in said first and second rotary directions by at least one of the following power sources: human power, machine power, hydraulic or pneumatic motors, electric motors.

11. A penetrating shaft type planetary gear train apparatus with a bidirectional input and a one-way output as claimed in claim 1, wherein said bidirectional power source is driven in one of said first and second rotary directions by at least one of the following power sources: human power, machine power, hydraulic or pneumatic motors, electric motors, and wherein said bidirectional power source is driven in a different one of said first and second rotary directions by a different one of said power sources.

12. A penetrating shaft type planetary gear train apparatus with a bidirectional input and a one-way output as claimed in claim 1, wherein transmission ratios of said first and second drive trains differ such that an output speed of said output shaft (3000) depends on a direction of said input shaft (2000), said transmission ratios providing for acceleration, deceleration, or constant speed transmission of power between said input shaft (2000) and output shaft (3000).

* * * * *